United States Patent
He et al.

(10) Patent No.: US 9,716,995 B2
(45) Date of Patent: Jul. 25, 2017

(54) SYSTEMS AND METHODS FOR DYNAMICALLY ADJUSTING ROAMING PARAMETERS

(71) Applicant: QUALCOMM Incorporated, San Diego, CA (US)

(72) Inventors: Jianqiang He, San Diego, CA (US); Dinesh Davuluru, San Diego, CA (US); Linzhao Ye, San Diego, CA (US); Ravishanker Mudigonda, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 14/088,263

(22) Filed: Nov. 22, 2013

(65) Prior Publication Data

US 2015/0148031 A1     May 28, 2015

(51) Int. Cl.
| | |
|---|---|
| *H04W 4/00* | (2009.01) |
| *H04W 8/02* | (2009.01) |
| *H04W 36/08* | (2009.01) |
| *H04W 48/16* | (2009.01) |
| *H04W 48/20* | (2009.01) |
| *H04W 84/12* | (2009.01) |

(52) U.S. Cl.
CPC .............. *H04W 8/02* (2013.01); *H04W 36/08* (2013.01); *H04W 48/16* (2013.01); *H04W 48/20* (2013.01); *H04W 84/12* (2013.01)

(58) Field of Classification Search
CPC ................. H04W 8/02; H04W 84/12
USPC ........................................ 455/432.1; 370/338
See application file for complete search history.

(56) References Cited

U.S. PATENT DOCUMENTS

| | | | |
|---|---|---|---|
| 7,792,526 B2 | 9/2010 | Salomone | |
| 7,991,425 B2 | 8/2011 | Su et al. | |
| 8,089,939 B1* | 1/2012 | Mater | H04W 36/30 370/332 |
| 8,818,365 B1* | 8/2014 | Schlesener | H04W 40/36 370/352 |
| 2007/0147317 A1 | 6/2007 | Smith et al. | |
| 2009/0312014 A1* | 12/2009 | Su | H04W 36/26 455/432.1 |
| 2010/0097982 A1 | 4/2010 | Eichenberger et al. | |
| 2011/0196952 A1* | 8/2011 | Pape et al. | 709/223 |
| 2012/0170474 A1 | 7/2012 | Pekarske | |
| 2013/0115945 A1 | 5/2013 | Holostov et al. | |
| 2013/0150012 A1* | 6/2013 | Chhabra et al. | 455/418 |
| 2013/0170418 A1 | 7/2013 | Stauffer et al. | |

(Continued)

OTHER PUBLICATIONS

Gupta A., et al., "Energy Consumption and Conservation in WiFi Based Phones: A Measurement-Based Study", Sensor, Mesh and Ad Hoc Communications and Networks, 2007. SECON &APOS;07. 4th Annual IEEE Communications Society Conference on, IEEE, PI, Jun. 1, 2007 (Jun. 1, 2007), pp. 122-131, XP031128703, ISBN: 978-1-4244-1268-6.

(Continued)

*Primary Examiner* — Marcos Batista
(74) *Attorney, Agent, or Firm* — Paradice and Li LLP (57) ABSTRACT

This disclosure includes systems and methods for adjusting one or more roaming parameters using information regarding WLAN activity and/or a connection characteristic indicative of the reliability of the connection.

34 Claims, 4 Drawing Sheets

(56) References Cited

U.S. PATENT DOCUMENTS

2013/0324124 A1* 12/2013 Scribano ............... H04W 48/18
455/435.3

OTHER PUBLICATIONS

International Search Report and Written Opinion—PCT/US2014/066218—ISA/EPO—Mar. 4, 2015.
Joe I., et al., "An Adaptive Network Scanning Algorithm in Hybrid Wireless Networks", Ubiquitous Information Technologies & Applications, 2009. ICUT '09 .. Proceedings of the 4th International Conference on, IEEE, Piscataway, NJ, USA, Dec. 20, 2009 (Dec. 20, 2009), pp. 1-4, XP031623664, ISBN: 978-1-4244-5131-9.

* cited by examiner

SYSTEMS AND METHODS FOR DYNAMICALLY ADJUSTING ROAMING PARAMETERS

FIELD OF THE PRESENT DISCLOSURE

This disclosure generally relates to wireless communication systems and more specifically to systems and methods for roaming between access points.

BACKGROUND

Wireless Local Area Network (WLAN) devices, such as those conforming to the Institute for Electrical and Electronic Engineers (IEEE) 802.11 protocols, may associate with an access point (AP) to communicate with the network. Although association with the AP allows communication with other devices also present on the WLAN, often the device may use the AP as a gateway to access a Wide Area Network (WAN), such as the Internet. Particularly for mobile devices, the availability of APs within range and the quality of the communication links offered by such APs may vary. To improve user experience, it may be desirable for the device to periodically monitor the wireless environment for available APs and then associate with the AP that currently offers the best reception.

Conventionally, these capabilities are achieved through the use of roaming parameters. For example, the device may scan for other available APs at a defined roaming interval. During this process, if a candidate AP having better signal quality is discovered, the device may hand over the connection from the current AP to the candidate AP. Although it may be beneficial to identify APs that may offer improved link quality, the discovery process represents power expenditure and may require periods of unavailability in the context of the current WLAN when looking for APs operating on other channels. Typically, the roaming interval may have a fixed value designed to minimize roaming scans so that unnecessary power consumption is avoided and communication disruptions resulting from going off channel to perform the roaming scans are reduced.

However, the use of fixed roaming parameters does not accommodate certain use cases and may lead to undesirable performance characteristics. For example, in typical home environment, only one AP may be available. Thus, continual roaming scans may be performed even though no alternative APs exist. To address such situations, the roaming interval may be increased when no alternative APs are discovered. Although this may mitigate the power consumption, unnecessary scans may still be performed when no additional APs exist or an unnecessary delay in discovering a new AP may result if such an AP does become available.

Another conventional strategy for adjusting roaming parameters is based on the operational state of the device's processor. For example, applications running on the device processor may be the source or sink for data exchanged over the WLAN. Accordingly, the device processor being in suspend or other power saving mode may be taken as an indication that there is no demand for communication over WLAN, allowing roaming scans to be disabled on the assumption there is no current need for connectivity.

This strategy also has drawbacks because the operational state of the device processor may not accurately reflect actual demand for WLAN communications. For example, the device processor may be active when running an application that does not require WLAN traffic, such as playback of local media files, and more roaming scans than necessary may be conducted. In another example, data processing may be offloaded from the device processor to the WLAN transceiver, such that the WLAN transceiver processes data packets without involvement of the device processor, and it would be desirable for the WLAN connection to be optimized even though the processor is inactive. Further, many communication exchanges may be initiated at an external source. Even if the device processor is not currently being used, having a robust WLAN connection may reduce delays in receiving such communications. In these types of scenarios, the device processor operational state may not be a valid indication of WLAN roaming demand. For example, if the device processor is in power save mode, more desirable alternative APs may not be discovered, preventing or delaying incoming communications that may be delivered over the WLAN.

Accordingly, this disclosure is directed to dynamically adjusting one or more roaming parameters based, at least in part, on criteria corresponding to WLAN activity or connectivity characteristics. In turn, energy expended to discover alternative APs exhibiting more desirable performance characteristics may be balanced against demand for connectivity and current channel conditions.

SUMMARY

This disclosure involves systems and methods for wireless communication, such as a method for identifying available APs in a wireless environment. A wireless communications device may monitor data exchanged by a WLAN transceiver of the device, determine a connection characteristic regarding a communications link between an AP and the wireless communications device, adjust a roaming parameter based, at least in part, on the monitored data exchange and the determined connection characteristic and perform a roaming scan using the roaming parameter. As desired, the roaming parameter may be at least one of a roaming threshold, a switching threshold and a roaming interval.

In one aspect, monitoring data may include identifying an access category for the monitored data and adjusting the roaming parameter further comprises adjusting the roaming parameter based, at least in part, on the access category. Further, the access category may be at least one of voice traffic, video traffic, best effort traffic and background traffic. Additionally, adjusting the roaming parameter may include adjusting the roaming interval and also may include adjusting the roaming threshold.

In another aspect, the roaming parameter may be adjusted to an idle value when no traffic is monitored for a given period.

In yet another aspect, an operational status of a radio access technology (RAT) transceiver collocated on the device may be collected, such that adjusting the roaming parameter may be based, at least in part, on the operational status. Further, the operational status may be obtained from an interface between the WLAN transceiver and the RAT transceiver that does not require involvement from a host processor of the device.

Additionally, the method may include obtaining WLAN usage from an application running on a host processor of the device, such that adjusting the roaming parameter may be based, at least in part, on the WLAN usage.

This disclosure also includes a wireless communications device for identifying available APs in a wireless environment. The wireless communications device may have a WLAN transceiver and a roaming controller, such that the roaming controller may be configured to monitor data exchanged by the WLAN transceiver, determine a connection characteristic regarding a communications link between an AP and the wireless communications device and adjust a roaming parameter based, at least in part, on the monitored data and the determined connection characteristic. The roaming parameter may be at least one of a roaming threshold, a switching threshold and a roaming interval.

In one aspect, the roaming controller may monitor data exchanged by the WLAN transceiver by identifying an access category for the exchanged data and may adjust the roaming parameter based, at least in part, on the access category. Further, the access category may be at least one of voice traffic, video traffic, best effort traffic and background traffic.

In another aspect, the roaming controller may be configured to adjust the roaming interval and the roaming threshold.

Further, the roaming controller may adjust the roaming parameter to an idle value when no traffic is monitored for a given period.

In yet another aspect, the wireless communications device may have a RAT transceiver collocated on the device, such that the roaming controller may be configured to collect an operational status of the RAT transceiver and may adjust the roaming parameter based, at least in part, on the operational status. Additionally, the wireless communications device may include a host processor and an interface between the WLAN transceiver and the RAT transceiver, such that the interface does not require involvement from a host processor of the device and the roaming controller may collect the operational status over the interface.

In another aspect, the wireless communications device may include a host processor such that the roaming controller may be configured to obtain WLAN usage from an application running on the host processor and may adjust the roaming parameter based, at least in part, on the WLAN usage.

This disclosure also includes a non-transitory processor-readable storage medium for identifying available APs in a wireless environment with a wireless communications device, the processor-readable storage medium having instructions thereon, when executed by a processor may cause the wireless communications device to monitor data exchanged by a wireless local area network (WLAN) transceiver of the device, determine a connection characteristic regarding a communications link between an AP and the wireless communications device and adjust a roaming parameter based, at least in part, on the monitored data exchange and the determined connection characteristic. The roaming parameter may be at least one of a roaming threshold, a switching threshold and a roaming interval.

In one aspect, the instructions to monitor data exchanged by the WLAN transceiver may include instructions to identify an access category for the monitored data and the instructions to adjust the roaming parameter may adjust the roaming parameter based, at least in part, on the access category. The access category may be at least one of voice traffic, video traffic, best effort traffic and background traffic.

In another aspect, the instructions to adjust the roaming parameter may adjust the roaming interval and the roaming threshold.

In yet another aspect, the instructions to adjust the roaming parameter may adjust the roaming parameter to an idle value when no traffic is monitored for a given period.

As desired, the storage medium may also include instructions for collecting an operational status of a RAT transceiver collocated on the device and the instructions for adjusting the roaming parameter may adjust the roaming parameter based, at least in part, on the operational status. Further, the operational status may be obtained from an interface between the WLAN transceiver and the RAT transceiver that does not require involvement from a host processor of the device.

In one aspect, the storage medium may include instructions for obtaining WLAN usage from an application running on a host processor of the device and the instructions for adjusting the roaming parameter may adjust the roaming parameter based, at least in part, on the WLAN usage.

This disclosure may also involve a method for identifying available APs in a wireless network including monitoring data exchanged by a WLAN transceiver of a wireless communications device in the network and adjusting a roaming interval and a roaming threshold. Additionally, monitoring data exchanged by the WLAN transceiver may identify an access category for the monitored data such that adjusting at least one of the roaming interval and roaming threshold may be based, at least in part, on the access category. Further, the access category may be at least one of voice traffic, video traffic, best effort traffic and background traffic.

BRIEF DESCRIPTION OF THE DRAWINGS

Further features and advantages will become apparent from the following and more particular description of the preferred embodiments of the disclosure, as illustrated in the accompanying drawings, and in which like referenced characters generally refer to the same parts or elements throughout the views, and in which.

DETAILED DESCRIPTION

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments that may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Embodiments are described herein with regard to a wireless communications device, which may include any suitable type of user equipment, such as a system, subscriber unit, subscriber station, mobile station, mobile wireless terminal, mobile device, node, device, remote station, remote terminal, terminal, wireless communication device, wireless communication apparatus, user agent, or other client devices. Further examples of a wireless communications device include mobile devices such as a cellular telephone, cordless telephone, Session Initiation Protocol (SIP) phone, smart phone, wireless local loop (WLL) station, personal digital assistant (PDA), laptop, handheld communication device, handheld computing device, satellite radio, wireless modem card and/or another processing device for communicating over a wireless system. Moreover, embodiments may also be described herein with regard to an access point (AP). An AP may be utilized for communicating with one or more wireless nodes and may be termed also be called and exhibit functionality associated with a base station, node, Node B, evolved NodeB (eNB) or other suitable network entity. An AP communicates over the air-interface with wireless terminals. The communication may take place through one or more sectors. The AP may act as a router between the wireless terminal and the rest of the access network, which may include an Internet Protocol (IP) network, by converting received air-interface frames to IP packets. The AP may also coordinate management of attributes for the air interface, and may also be the gateway between a wired network and the wireless network.

Unless defined otherwise, all technical and scientific terms used herein have the same meaning as commonly understood by one having ordinary skill in the art to which the disclosure pertains.

Finally, as used in this specification and the appended claims, the singular forms "a, "an" and "the" include plural referents unless the content clearly dictates otherwise.

Figure 1:
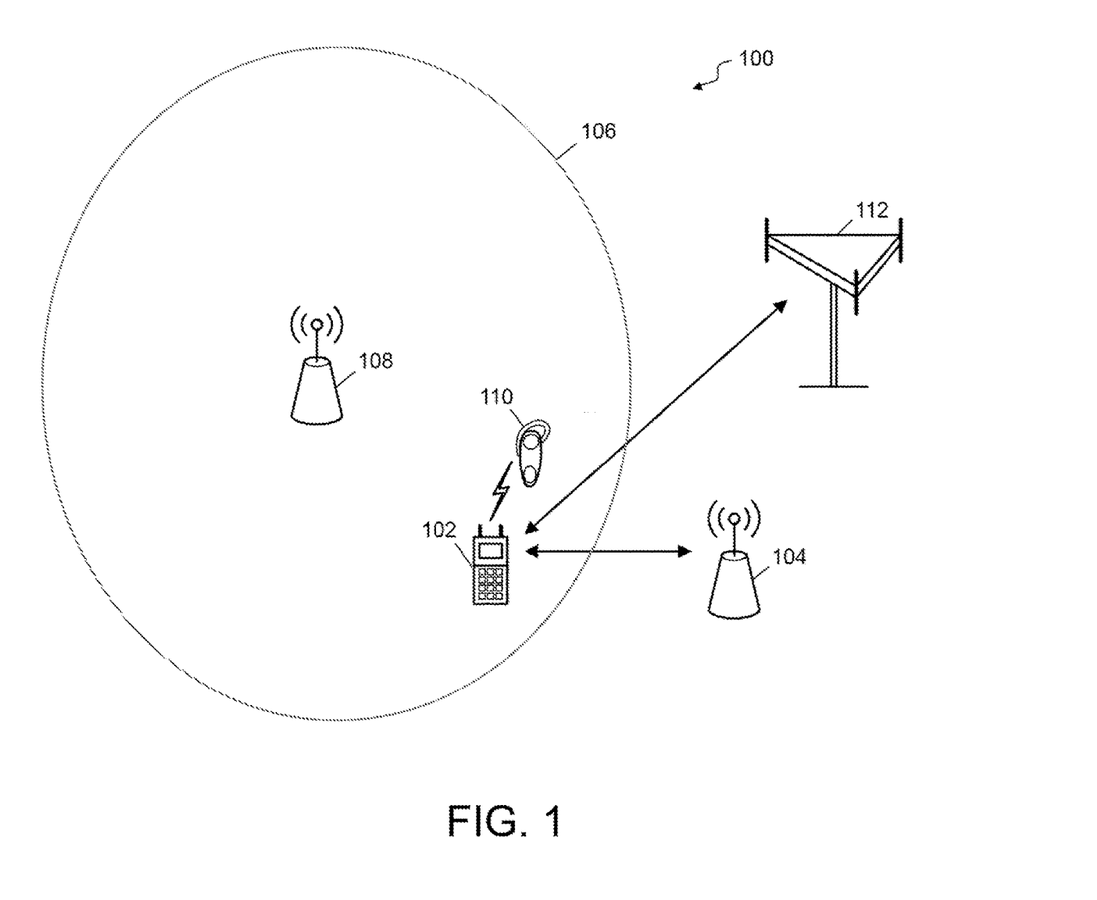
FIG. 1 schematically depicts a wireless environment, according to one embodiment.

Aspects of the present disclosure may be exemplified in the context of the wireless environment 100 depicted in FIG. 1. As shown, wireless communications device 102 may be associated with a first AP 104. One or more additional APs may be within range of wireless communications device 102. For clarity, this example indicates that wireless communications device 102 is within range 106 of alternative AP 108. However, the number of APs available to wireless communications device 102 may vary over time depending on relative movement between wireless communications device 102 and the APs as well as on operation of the APs themselves. Depending on the design and capabilities of wireless communications device 102, additional wireless protocols may also be employed which are termed radio access technologies (RATs). For example, shorter range communications, which may be characterized as a personal area network (PAN), may be provided using a BLUETOOTH® (Bluetooth) protocol to connect and exchange information between mobile phones, computers, digital cameras, wireless headsets, speakers, keyboards, mice or other input peripherals, and similar devices. Accordingly, wireless communications device 102 may be paired with a Bluetooth device such as headset 110. Additionally, longer range communications, which may be characterized as a wide area network (WAN), may be provided using a cellular based technology. In the embodiment shown, wireless communications device 102 may be linked to cellular base station 112. In other embodiments, wireless communications device 102 may feature any number of suitable RATs, including, without limitation, code division multiple access (CDMA), time division synchronous code division multiple Access (TD-SCDMA), high speed packet access (HSPA(+)), high-speed downlink packet access (HSDPA), global system for mobile communications (GSM), enhanced data GSM environment (EDGE), WiMax®, ZigBee®, wireless universal serial bus (USB), and the like.

As described above, wireless communications device 102 may switch association from AP 104 to another available AP, such as AP 108, in a process known as roaming. Roaming parameters, including a roaming threshold, a switching threshold and a roaming interval, may be used to tailor the behavior of wireless communications device 102. For example, the roaming threshold may establish a desired level of connectivity performance and the roaming interval may establish the frequency at which scans for alternative devices are conducted when the current AP association does not exhibit the desired level of connectivity. When one or more characteristics of the communications link between wireless communications device 102 and AP 104 is above the roaming threshold, the connection may be deemed sufficient so that wireless communications device 102 does not need to look for alternative APs and roaming scans may be suspended to conserve power.

Correspondingly, when the connection does not meet a roaming threshold which may be expressed in terms of one or more connectivity characteristics, wireless communications device 102 may attempt to discover an alternative AP exhibiting more desirable connectivity characteristics by performing roaming scans at a frequency established by the roaming interval. As will be appreciated, the length of the roaming interval represents a balance between how quickly wireless communications device 102 may determine the existence of a suitable alternative AP and the amount of power consumed.

Additionally, the switching threshold may be used to determine whether the communication link over the alternate AP is sufficiently improved to justify the overhead associated with terminating the current link and associating with that AP. In some embodiments, the evaluation to determine whether the switching threshold has been reached may be performed over a period of time, such as by taking the average of the characteristic.

As will be discussed below, aspects of this disclosure include adjusting one or more roaming parameters, such as roaming threshold, switching threshold, roaming interval and others as may be appropriate. Further, two or more roaming parameters may be jointly adjusted or defined sets of parameters may be adjusted concurrently to achieve the desired effect on performance.

Suitable connectivity characteristics may include indicators of the reliability of the radio frequency (RF) link between wireless communications device 102 and AP 104 or AP 108. Without limitation, metrics that may be used include signal strength, which may be in the form of the received signal strength indicator (RSSI), signal to noise ratio (SNR), signal to interference plus noise ratio (SINR), packet error rate (PER), delay, jitter, number of out-of-order packets, and the like. As desired, the roaming threshold or switching threshold may be expressed as one or more of such metrics.

Depending on the embodiment and desired performance, wireless communications device 102 may use one or more connectivity characteristics regarding a current AP association, such as the link with AP 104 indicated in FIG. 1, when adjusting a roaming parameter. Further, wireless communications device 102 may also use one or more connectivity characteristics of an alternative AP, such as AP 108, which may be available from a recent roaming scan.

Wireless communications device 102 may also be configured to use information regarding WLAN activity to adjust one or more roaming parameters. WLAN activity may be an exchange of data between the WLAN transceiver of the device and any application running on the device processor or an exchange of data between the WLAN transceiver of the device and an associated AP. As desired, determinations of WLAN activity may also include characterizing the nature of the WLAN traffic. For example, WLAN activity may be identified according to standard quality of service (QoS) access categories, including voice, video, best effort and background classes, or any other suitable category. Correspondingly, different roaming parameters may be configured for existing categories of data or may be configured for other traffic classes, such as a user-defined category or an application-dependent category In another aspect, wireless communications device 102 may also use information regarding an operational state of an additional RAT, such as one used for communication with headset 110 or base station 112. Use of multiple RATs provides increased flexibility by leveraging different attributes, but may increase the risk of interference due to operation on the same band as the WLAN system, such as Bluetooth, or on adjacent bands, such as LTE and TD-SCDMA. As such, different roaming parameters may be employed depending on which RATs are operational.

In yet another aspect, wireless communications device 102 may use information regarding WLAN usage from an application running on a processor of the device. The application may be a source or sink of data exchanged by the WLAN system and the information may reflect current or projected requirements.

Pursuant to the techniques of this disclosure, wireless communications device 102 may be configured to dynamically adjust one or more roaming parameters. For example, in one embodiment wireless communications device 102 may adjust the roaming interval and the roaming threshold depending on WLAN activity. Further, wireless communications device 102 may also adjust the switching threshold depending on WLAN activity or current connection characteristics. In another embodiment, wireless communications device 102 may adjust one or more roaming parameters using information regarding WLAN activity and one or more current connection characteristics.

Figure 2:
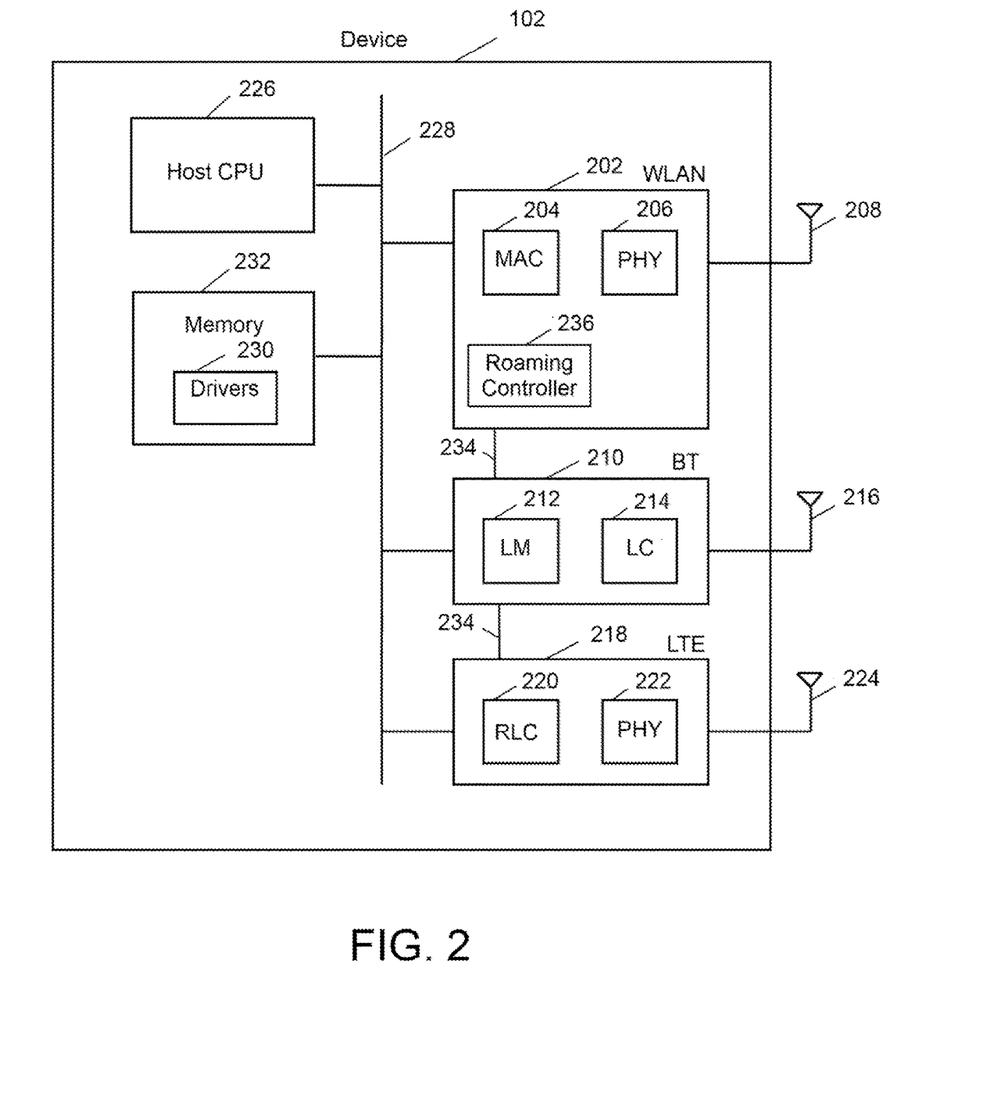
FIG. 2 schematically depicts a wireless communications device for adjusting roaming parameters, according to one embodiment.

Aspects of the present disclosure may be implemented within the hardware circuitry and/or software processes of wireless communications device 102, one embodiment of which is depicted in the high level schematic diagram shown in FIG. 2. Wireless communications device 102 may employ an architecture in which the lower levels of the respective protocol stacks of one or more RATs may be implemented in firmware and hardware modules. Wireless communications device 102 may therefore include WLAN module 202, having media access controller (MAC) 204 that performs functions related to the handling and processing of frames of data including verification, acknowledgment, routing, formatting and the like. Incoming and outgoing frames are exchanged between MAC 204 and physical layer (PHY) 206, which may include the functions of modulating the frames according to the relevant 802.11 protocol as well as providing the analog processing and RF conversion necessary to provide transmission and reception of wireless signals through antenna 208.

Depending on the design and capabilities of wireless communications device 102, additional wireless protocols using RATs may also be employed. For example, wireless communications device 102 may also include Bluetooth module 210, having a link manager (LM) 212 for managing the Bluetooth RF link as well as link controller (LC) 214 for performing hardware-specific transmission and reception of electronic signals, and may be coupled to antenna 216. Longer range communications may be provided using a cellular based technology, such as Long Term Evolution (LTE). As shown, wireless communications device 102 includes LTE module 218, implementing a data link layer and controls access to the wireless medium through radio link controller (RLC) 220 which may be configured to perform functions related to the handling and processing of frames of data including verification, acknowledgment, routing, formatting and the like. Incoming and outgoing frames may be exchanged between RLC 220 and physical layer (PHY) 222. Together, RLC 220 and PHY 222 modulate frames of information according to the LTE protocol and provide the analog processing and RF conversion necessary to transmit and receive wireless signals through antenna 224.

While each RAT module is shown as having a dedicated antenna for the purpose of illustration, wireless communications device 102 may include multiple antennas for each RAT as desired, such as to enable the use of multiple streams. Further, wireless communications device 102 may be configured to share any number of antennas between the RATs using conventional antenna switching techniques. One or more of WLAN module 202, Bluetooth module 210 and LTE module 218 may be co-located on a common system (e.g., on the same circuit board or on distinct circuit boards within the same system, or may be embedded on the same integrated circuit as in a system on a chip (SoC) implementation).

Wireless communications device 102 may also include host CPU 226 configured to perform the various computations and operations involved with the functioning of wireless communications device 102. Host CPU 226 may be coupled to WLAN module 202, Bluetooth module 210 and LTE module 218 through bus 228, which may be implemented as a peripheral component interconnect express (PCIe) bus, a universal serial bus (USB), a universal asynchronous receiver/transmitter (UART) serial bus, a suitable advanced microcontroller bus architecture (AMBA) interface, a serial digital input output (SDIO) bus, or other equivalent interface. Upper layers of the protocol stacks of the respective RAT systems may be implemented in software as Drivers 230 stored in memory 232 that may be accessed by host CPU 226 over bus 228. In the embodiment shown, wireless communications device 102 also features a dedicated coexistence interface 234 to convey information regarding operational status between WLAN module 202, Bluetooth module 210 and LTE module 218. As known in the art, coexistence interface 234 may be employed to help coordinate transmission and reception when using the respective modules to minimize possible interference that may result from use of the same or similar frequencies. Coexistence interface 234 may be implemented at a hardware level that does not require involvement of host CPU 226 to exchange information regarding operational of the respective RATs.

In one aspect, wireless communications device 102 may include roaming controller 236 implemented in WLAN module 202, such as at the MAC 204 layer, as shown. Under the techniques of this disclosure, roaming controller 236 may determine information regarding WLAN activity and current connection characteristics to dynamically adjust one or more roaming parameters. As indicated above, roaming controller 236 may also adjust roaming parameters using information regarding connection characteristics of candidate APs and/or information regarding an operational state of an additional RAT, such as from Bluetooth module 210 or LTE module 218. In one embodiment, roaming controller 236 may obtain the connection characteristics from WLAN module 202 and the operational state information over coexistence interface 234. Correspondingly, roaming controller 236 may adjust one or more roaming parameters without involvement of host CPU 226.

Further, an application, stored in memory 232 and running on host CPU 226 may be a source or sink for data exchanged by WLAN module 202. Information regarding current or projected data transfers associated with the application may be obtained by roaming controller 236 over bus 228, for example. Accordingly, information about data usage at the application level may be used by roaming controller 236 to adjust one or more roaming parameters in addition to monitored WLAN activity, connection characteristics and/or RAT operational status as described above.

Figure 3:
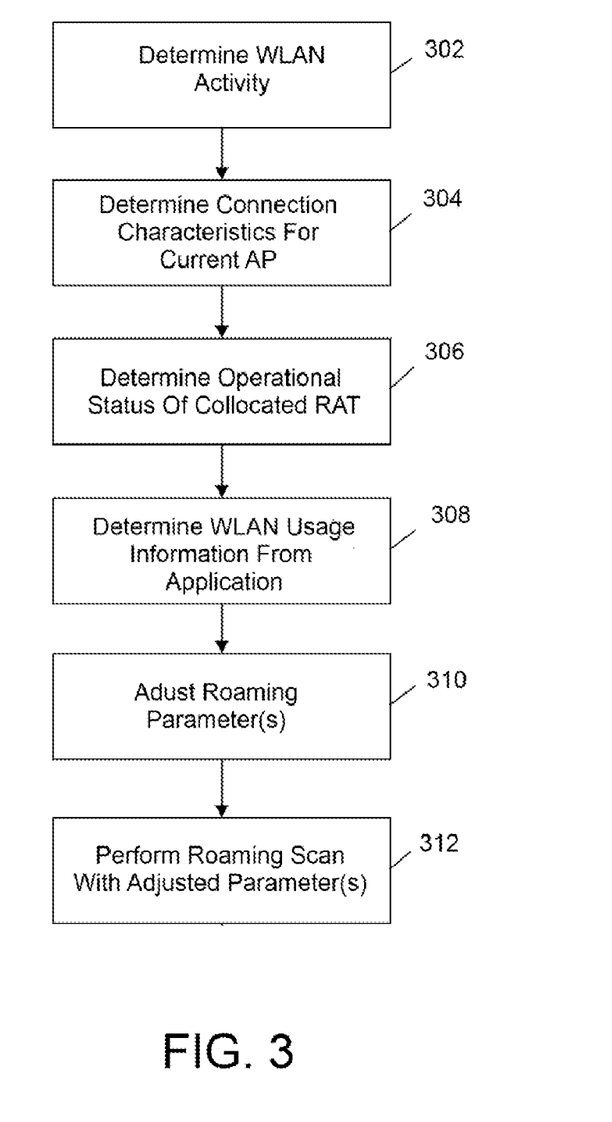
FIG. 3 depicts a flowchart representing an exemplary routine for adjusting roaming parameters, according to one embodiment.

To help illustrate aspects of the disclosure, a representative routine for dynamically adjusting a roaming parameter is depicted in the flowchart of FIG. 3. Beginning with 302, roaming controller 236 may determine current WLAN activity. As described above, WLAN activity may be evaluated in terms of whether data is being actively exchanged through WLAN module 202, either with a source or sink application running on host CPU 226 or with a remote AP, such as AP 104. Further, WLAN activity may be given a priority in terms of traffic class or other suitable categorization. Next, in 304, roaming controller 236 may determine one or more connectivity characteristics regarding the current WLAN link, such as with AP 104 in the embodiment shown in FIG. 1. Roaming controller 236 may also determine information regarding the operational status of another RAT, as indicated by 306. In 308, roaming controller 236 may also determine information regarding WLAN usage from an application running on host CPU 226. Using any combination of determinations from 302, 304, 306 and 308, roaming controller 236 may then adjust one or more roaming parameters in 310. As indicated by 312, wireless communications device 102 may conduct a roaming scan using at least one of the adjusted parameters.

Figure 4:
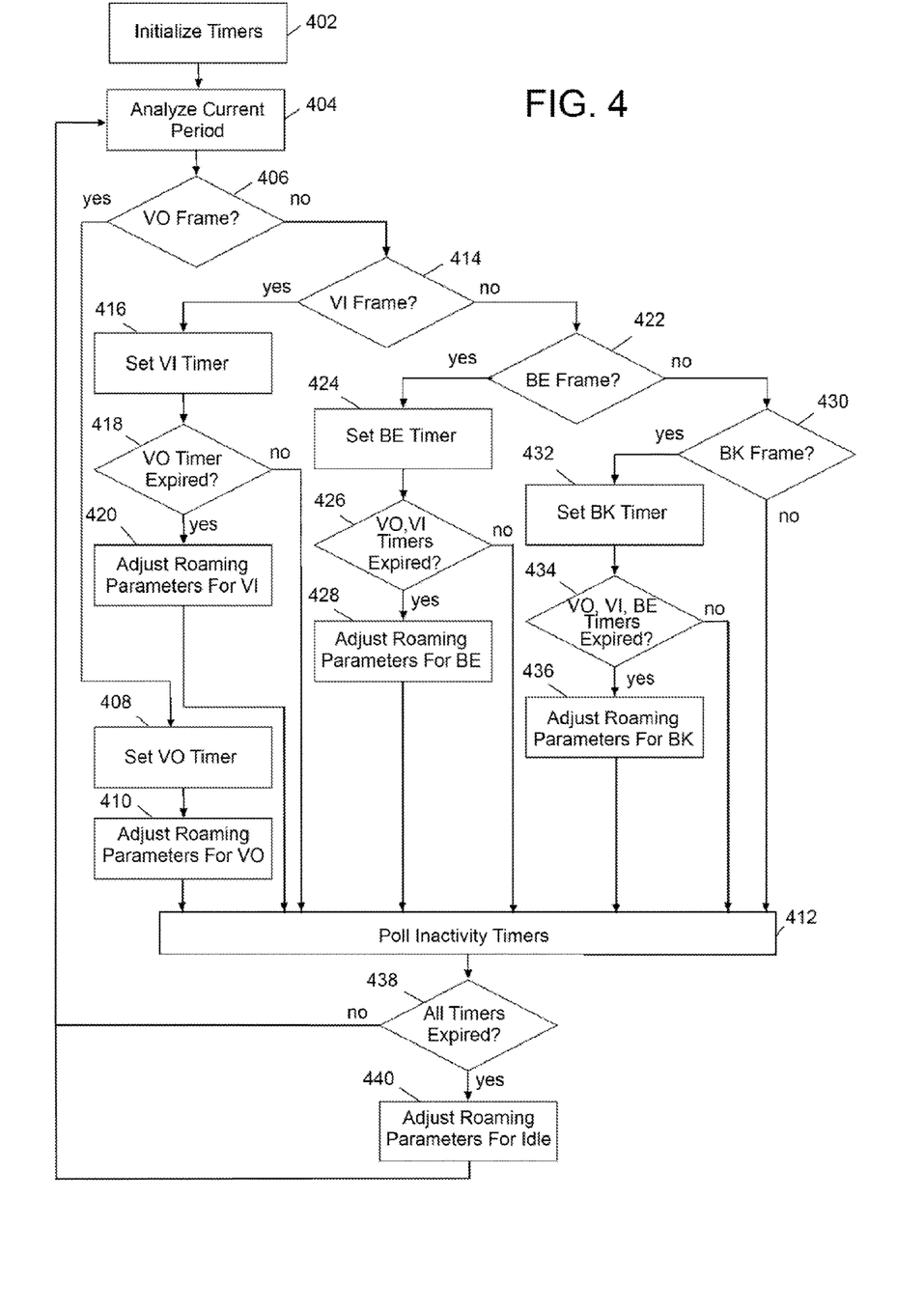
FIG. 4 depicts a flowchart representing a routine for adjusting roaming parameters by monitoring data exchange, according to one embodiment.

One example of adjusting roaming parameters based, at least in part, on WLAN activity is represented by the flowchart depicted in FIG. 4 that may be performed by roaming controller 236. As shown, inactivity timers may be established for traffic classes that may be employed to assess whether there has been any traffic belonging to that class within a designated period. This embodiment provides four categories corresponding to voice, video, best effort and background traffic classes, but WLAN traffic may be organized into any suitable number of categories. Whenever data belonging to a given category is exchanged, the corresponding inactivity timer may be reset. In the example shown, sequentially less stringent roaming parameters may be employed as the QoS requirements decrease. Thus, if voice traffic has been exchanged within the period of time defined by the voice inactivity timer, roaming parameters associated with voice traffic may be employed. In turn, if there has been no voice traffic within the voice inactivity period but there has been video traffic within the video traffic inactivity period, roaming parameters associated with video traffic may be employed. Similarly, roaming parameters associated with best effort or background traffic may be employed if traffic of that category has been exchanged within the corresponding inactivity periods. This implementation may be used to set the roaming parameters to the highest priority access category currently experiencing activity. If no traffic in any category has been exchanged, then idle roaming parameters (e.g., relatively least stringent), may be employed.

Beginning with 402, inactivity timers for each traffic class may be initialized. Then, in 404, the most recent period is analyzed to determine whether frames have been exchanged. As shown, a series of cascading evaluations are performed to identify the traffic class associated with any involved frames. First, in 406, a determination is made whether a voice (VO) frame has been exchanged in the analysis period. If yes, the routine flows to 408 to set the voice inactivity timer to a desired value, which then counts down. As such, the inactivity timer may be configured to represent an amount of time during which another voice frame may be expected if traffic is actively being exchanged. Since a voice frame has been exchanged, roaming parameters such as the roaming threshold and the roaming interval may be adjusted to values configured to provide a desired level of performance for voice traffic in 410. This branch of the routine then continues to 412, in which all inactivity timers are monitored, as will be described below.

Alternatively, if no voice frame has been exchanged, the next determination is whether a video (VI) frame has been exchanged in 414. If yes, in 416 the video inactivity timer is set to a desired value. Again, this value may be configured to represent a desired level of performance for video traffic. Next, a determination is made whether inactivity timers corresponding to traffic classes having higher priority have expired in 418, in this case only the voice timer has a higher priority. Thus, if the voice timer has not expired, the routine flows to 412. Otherwise, if the voice timer has expired, roaming parameters such as the roaming threshold and the roaming interval may be adjusted to values configured to provide a desired level of performance for video traffic in 420 and the routine may rejoin at 412.

Similarly, if 414 determines there has been no video frame in the current period, the next determination is whether a best effort (BE) frame has been exchanged in 422. If yes, in 424 the best effort inactivity timer is set to a desired value, which may represent a desired level of performance for best effort traffic. Then, roaming controller 236 determines whether the higher priority inactivity timers for voice and video have expired in 426. If either timer is still counting down, the routine flows to 412. Otherwise, roaming parameters such as the roaming threshold and the roaming interval may be adjusted to values configured to provide a desired level of performance for best effort traffic in 428 and the routine may rejoin at 412.

Finally, if 422 determines there has been no best effort frame in the current period, the next determination is whether a background (BK) frame has been exchanged in 430. If yes, in 432 the background inactivity timer is set to a desired value, which may represent a desired level of performance for background traffic. Roaming controller 236 then determines whether the higher priority inactivity timers for voice, video and best effort have expired in 434. If the higher priority timers are still counting down, the routine flows to 412. Otherwise, roaming parameters such as the roaming threshold and the roaming interval may be adjusted to values configured to provide a desired level of performance for background traffic in 436 and the routine may rejoin at 412.

As described above, each branch of the routine rejoins at 412 to poll all the inactivity timers. Consequently, in 438, roaming controller 236 determines whether any timer is still counting down, and if so, the routine may return to 404 so that a subsequent period may be analyzed for WLAN activity. Since at least one timer is still running, the adjustment to the roaming parameters may continue to be applied. Alternatively, if all of the timers have expired, roaming parameters such as the roaming threshold and the roaming interval may be adjusted to values configured to provide a desired level of performance corresponding to an idle condition in 440 and the routine may return to 404.

In other embodiments, all traffic may be grouped together such that one set of roaming parameters may be employed whenever any data is exchanged between the WLAN module 202 and an application running on host CPU 226 or whenever any data is exchanged between WLAN module 202 and the remote AP, such as AP 104, and another set of roaming parameters may be employed when no data is currently being exchanged. Further, roaming controller 236 may use one or more connectivity characteristics regarding a current AP association and/or an alternative AP when adjusting a roaming parameter. Still further, information regarding operational status of a RAT may also be used by roaming controller 236 to adjust a roaming parameter. For example, roaming controller 236 may obtain the operational information over coexistence interface 234. As another example, one or more traffic categories may be user-defined or associated with a particular application. As desired, any suitable values may be employed for the roaming parameters associated with each traffic class and the same or different inactivity timer periods may be used for each category of traffic. Notably, these techniques do not require involvement of the device processor or any associated applications and may be implemented by roaming controller 236.

Further details regarding this disclosure may be described in the context of various usage scenarios. As noted, one or more roaming parameters may be adjusted using information regarding connection characteristics as well as WLAN activity to provide improved performance. Connection characteristics indicating RF connection reliability are independent of WLAN activity and the traffic classes associated with that activity. Accordingly, connection characteristics may also be used to adjust roaming parameters depending on the reliability of the connection.

In one example, the roaming interval may be adjusted using a connection characteristic. When the connection characteristic indicates the current WLAN association is relatively reliable, the roaming interval may be adjusted to a correspondingly longer period, with the assumption that given a reliable connection, there is less need to discover an alternative connection. Thus, in addition to the use of roaming threshold to determine whether or not to perform a scan, the frequency at which the scan is performed may be tailored to reflect the quality of the connection. Indeed, by setting the roaming interval to a suitably long, or indefinite, period, some embodiments may avoid the use of a roaming threshold. Similarly, as the quality of the connection degrades, it may be desirable to expend the energy associated with performing roaming scans with increased frequency in order to reduce the period of time until the discovery of an alternative AP when one becomes available. In another example, information regarding one or more connectivity characteristics may be used to adjust the switching threshold, such as by setting the switching threshold relatively higher when the current connection is good and reducing the switching threshold if the connection degrades.

Additional refinements in performance may also be achieved by using information regarding the operational status of a collocated RAT to adjust one or more roaming parameters. As discussed above, RATs such as Bluetooth, LTE and TD-SCDMA may increase the risk of mutual interference due to operation on the same or similar frequencies. Referring back to FIG. 1, wireless communications device 102 may be engaged in a voice call using the connection with base station 112 with audio routed to headset 110. Due to the increased risk of interference between the WLAN and Bluetooth systems appropriate adjustments to one or roaming parameters may be made in anticipation of a less reliable connection, even if current connection characteristics do not reflect a decrease in quality. Further, operational status regarding the Bluetooth system may be used to adjust roaming parameters to reduce the chance of disruption in Bluetooth performance that may occur when a WLAN scan is performed using information obtained over coexistence interface 234 without involvement of host CPU 226. Similar adjustments may be made in light of operation of LTE module 218.

Described herein are presently preferred embodiments. However, one skilled in the art that pertains to the present embodiments will understand that the principles of this disclosure can be extended easily with appropriate modifications to other applications.

What is claimed is:

1. A method for identifying available access points (APs) in a wireless environment with a wireless communications device, comprising:
   monitoring data exchanged by a wireless local area network (WLAN) transceiver of the device;
   determining a connection characteristic of a communications link between an AP and the wireless communications device;
   dynamically adjusting a roaming threshold based, at least in part, on changes in the monitored data and the determined connection characteristic, wherein the roaming threshold corresponds to a level of performance of the communications link at which roaming scans are suspended; and
   determining whether to perform a roaming scan, to discover other APs in the wireless environment while maintaining the communications link with the AP, based on a comparison between at least one characteristic of the communications link and the dynamically adjusted roaming threshold.

2. The method of claim 1, further comprising adjusting a switching threshold or a roaming interval based, at least in part, on the monitored data or the determined connection characteristic.

3. The method of claim 1, wherein monitoring data exchanged by the WLAN transceiver comprises identifying an access category for the monitored data and dynamically adjusting the roaming threshold comprises adjusting the roaming threshold based, at least in part, on the access category.

4. The method of claim 3, wherein the access category comprises at least one of voice traffic, video traffic, best effort traffic or background traffic.

5. The method of claim 3, further comprising adjusting a roaming interval, based, at least in part, on the monitored data or the determined connection characteristic.

6. The method of claim 1, further comprising adjusting a roaming parameter to an idle value when no traffic is monitored for a period of time.

7. The method of claim 1, further comprising collecting an operational status of a radio access technology (RAT) transceiver collocated on the device, wherein dynamically adjusting the roaming threshold is further based, at least in part, on the operational status.

8. The method of claim 7, wherein collecting the operational status comprises obtaining the operational status from an interface between the WLAN transceiver and the RAT transceiver that does not require involvement from a host processor of the device.

9. The method of claim 1, further comprising obtaining WLAN usage from an application running on a host processor of the device, wherein dynamically adjusting the roaming threshold is further based, at least in part, on the WLAN usage.

10. The method of claim 1, further comprising:
determining that the at least one characteristic of the communications link is above the roaming threshold; and
suspending roaming scans in response to the determination that the at least one characteristic of the communications link is above the roaming threshold.

11. The method of claim 1, further comprising:
determining that the at least one characteristic of the communications link is below the roaming threshold; and
performing one or more roaming scans in response to the determination that the at least one characteristic of the communications link is below the roaming threshold.

12. A wireless communications device for identifying available access points (APs) in a wireless environment, comprising a wireless local area network (WLAN) transceiver and a roaming controller, wherein the roaming controller is configured to:
monitor data exchanged by the WLAN transceiver;
determine a connection characteristic of a communications link between an AP and the wireless communications device;
dynamically adjust a roaming threshold based, at least in part, on changes in the monitored data and the determined connection characteristic, wherein the roaming threshold corresponds to a level of performance of the communications link at which roaming scans are suspended; and
determine whether to perform a roaming scan, to discover other APs in the wireless environment while maintaining the communications link with the AP, based on a comparison between at least one characteristic of the communications link and the dynamically adjusted roaming threshold.

13. The wireless communications device of claim 12, wherein the roaming controller is further configured to adjust a switching threshold or a roaming interval based, at least in part, on the monitored data or the determined connection characteristic.

14. The wireless communications device of claim 12, wherein the roaming controller is configured to monitor data exchanged by the WLAN transceiver by identifying an access category for the monitored data and to dynamically adjust the roaming threshold based, at least in part, on the access category.

15. The wireless communications device of claim 14, wherein the access category comprises at least one of voice traffic, video traffic, best effort traffic or background traffic.

16. The wireless communications device of claim 14, wherein the roaming controller is further configured to adjust a roaming interval based, at least in part, on the monitored data or the determined connection characteristic.

17. The wireless communications device of claim 12, wherein the roaming controller adjusts a roaming parameter to an idle value when no traffic is monitored for a given period.

18. The wireless communications device of claim 12, further comprising a radio access technology (RAT) transceiver collocated on the device, wherein the roaming controller is configured to collect an operational status of the RAT transceiver and to dynamically adjust the roaming threshold based, at least in part, on the operational status.

19. The wireless communications device of claim 18, further comprising a host processor and an interface between the WLAN transceiver and the RAT transceiver, wherein the interface does not require involvement from a host processor of the device and wherein the roaming controller collects the operational status over the interface.

20. The wireless communications device of claim 12, further comprising a host processor, wherein the roaming controller is configured to obtain WLAN usage from an application running on the host processor and to dynamically adjust the roaming threshold based, at least in part, on the WLAN usage.

21. The wireless communications device of claim 12, wherein the roaming controller is further configured to:
determine that the at least one characteristic of the communications link is above the roaming threshold; and
suspend roaming scans in response to the determination that the at least one characteristic of the communications link is above the roaming threshold.

22. The wireless communications device of claim 12, wherein the roaming controller is further configured to:
determine that the at least one characteristic of the communications link is below the roaming threshold; and
perform one or more roaming scans in response to the determination that the at least one characteristic of the communications link is below the roaming threshold.

23. A non-transitory processor-readable storage medium for identifying available access points (APs) in a wireless environment with a wireless communications device, the processor-readable storage medium having instructions thereon, when executed by a processor to cause the wireless communications device to:
monitor data exchanged by a wireless local area network (WLAN) transceiver of the device;
determine a connection characteristic regarding a communications link between an AP and the wireless communications device;
dynamically adjust a roaming threshold based, at least in part, on changes in the monitored data and the determined connection characteristic, wherein the roaming threshold corresponds to a level of performance of the communications link at which roaming scans are suspended; and
determine whether to perform a roaming scan, to discover other APs in the wireless environment while maintaining the communications link with the AP, based on a comparison between at least one characteristic of the communications link and the dynamically adjusted roaming threshold.

24. The storage medium of claim 23, wherein the instructions further cause the wireless communications device to adjust a switching threshold or a roaming interval based, at least in part, on the monitored data or the determined connection characteristic.

25. The storage medium of claim 23, wherein the instructions to monitor data exchanged by the WLAN transceiver cause the wireless communications device to identify an access category for the monitored data and to dynamically adjust the roaming threshold based, at least in part, on the access category.

26. The storage medium of claim 25, wherein the access category comprises at least one of voice traffic, video traffic, best effort traffic or background traffic.

27. The storage medium of claim 25, wherein the instructions further cause the wireless communications device to adjust a roaming interval based, at least in part, on the monitored data or the determined connection characteristic.

28. The storage medium of claim 23, wherein the instructions to dynamically adjust the roaming threshold cause the wireless communications device to adjust the roaming threshold to an idle value when no traffic is monitored for a given period.

29. The storage medium of claim 23, wherein the instructions further cause the wireless communications device to collect an operational status of a radio access technology (RAT) transceiver collocated on the device, and wherein the instructions for dynamically adjusting the roaming threshold further cause the wireless communications device to adjust the roaming threshold based, at least in part, on the operational status.

30. The storage medium of claim 29, wherein the operational status is obtained from an interface between the WLAN transceiver and the RAT transceiver that does not require involvement from a host processor of the device.

31. The storage medium of claim 23, wherein the instructions further cause the wireless communications device to obtain WLAN usage from an application running on a host processor of the device, and wherein the instructions for dynamically adjusting the roaming threshold cause the wireless communications device to adjust the roaming threshold based, at least in part, on the WLAN usage.

32. A method for identifying available access points (APs) in a wireless network, wherein the wireless network includes a wireless device that exchanges data with a first AP using a wireless local area network (WLAN) transceiver, comprising:
    monitoring the exchanged data;
    dynamically adjusting a roaming interval and a roaming threshold of the device based at least in part on changes in the monitored data, wherein the roaming threshold corresponds to a level of performance of the communications link at which roaming scans are suspended; and
    determining whether to perform a roaming scan, to discover other APs in the wireless environment while maintaining a communications link with the first AP, based at least in part on the adjustments to the roaming interval and the roaming threshold.

33. The method of claim 32, wherein monitoring the exchanged data comprises identifying an access category for the monitored data, and wherein at least one of the roaming interval or the roaming threshold is adjusted based, at least in part, on the access category.

34. The method of claim 33, wherein the access category comprises at least one of voice traffic, video traffic, best effort traffic or background traffic.

* * * * *